United States Patent [19]

Standridge et al.

[11] Patent Number: 4,824,580
[45] Date of Patent: Apr. 25, 1989

[54] METHOD FOR REMOVING WASTE OIL PARTICLES FROM A WASTE WATER FLUID STREAM

[75] Inventors: Robert Standridge, League City, Tex.; George R. Ratliff, Denham Springs; Corley P. Senyard, Sr., Baton Rouge, both of La.; Corley P. Senyard, Jr., Friendswood, Tex.; Steve L. Garrett, League City, Tex.; William H. Senyard, Houston, Tex.; Thomas J. Senyard, Baton Rouge, La.

[73] Assignee: Quad-S Consultants, Inc., Baton Rouge, La.

[21] Appl. No.: 208,577

[22] Filed: Jun. 13, 1988

[51] Int. Cl.$^4$ .............................................. B01D 17/04
[52] U.S. Cl. ..................................... 210/708; 210/714; 210/738; 210/801; 252/331
[58] Field of Search ............... 210/708, 714, 730, 738, 210/787, 799, 800–803, DIG. 5; 252/328, 331, 349, 358

[56] References Cited

U.S. PATENT DOCUMENTS

| | | | |
|---|---|---|---|
| 2,126,368 | 8/1938 | Colbeth | 210/708 X |
| 3,529,719 | 9/1970 | Graybill | 210/714 |
| 4,016,076 | 4/1977 | Lefeuvre | 210/708 |
| 4,389,306 | 6/1983 | Nakanishi et al. | 210/714 X |
| 4,481,130 | 11/1984 | Robertson | 252/328 |

Primary Examiner—Tom Wyse
Attorney, Agent, or Firm—Pravel, Gambrell, Hewitt, Kimball & Krieger

[57] ABSTRACT

A method for removing waste oil particles having a particle size generally in the range of 1–97 microns from a waste water stream includes first transmitting seed oil particles having a particle size of at least 20 microns into the waste water stream. The seed oil is allowed to mix with waste oil particles suspended in the waste water stream. Oil is then removed which includes a combination of the seed oil and combined waste oil particles.

12 Claims, 1 Drawing Sheet

METHOD FOR REMOVING WASTE OIL PARTICLES FROM A WASTE WATER FLUID STREAM

BACKGROUND OF THE INVENTION

1. Field of the Invention

The present invention relates to a method and apparatus for separating two immiscible substances, such as removing waste oil particles from a waste water stream of brine solution, and more particularly relates to an improved method of removing relatively small waste oil particles, for instance than with having a particle size in the range of less than 150 microns in diameter from a waste water stream of brine wherein seed oil particles are transmitted to the waste water stream from an external source and allowing the seed oil particles and the waste oil particles to comingle in the waste water stream for a time interval sufficiently long so that the waste oil particles combine with the seed oil particles prior to a removal of the oil using an oil/water separator.

2. General Background

Waste water streams commonly include as a pollutant, suspended oil particles, many of which are in the very small range of less than 150 microns in diameter. The separation of these very small oil particles can be quite difficult using common oil/water separators. Many times the waste water streams contain other components, such as brine, solids, gases, and dissolved hydrocarbons.

Several systems have been proposed for the separation of oil from a waste water stream.

U.S. Pat. No. 1,383,479, issued to W. W. Nugent, entitled "Combined Filter And Water Separator," relates to an apparatus for removing impurities from lubricating oil and also for separating water from lubricating oil, and the principal object of this invention is to provide an improved device of this nature which is made up of detachable sections to facilitate transportation and the assembly thereof at the place of use.

U.S. Pat. No. 2,656,508, issued to W. H. Coulter, and entitled "Means For Counting Particles Suspended In A Fluid," discloses a Coulter Counter device. The '508 patent relates to means for detecting and counting particles suspended in a fluid medium. The principal object of this invention is to provide a means for detecting and counting particles suspended in a fluid with a greater accuracy, more quickly, and economically. The apparatus consists of reducing the dimensions of or constricting an electric current path in a fluid so that the presence or controlled movement of the article bearing fluid in, through, or past such path will, by reason of the difference in conductivity between the fluid and the particles, cause the individual particles to modulate the current in a detectable manner.

U.S. Pat. No. 2,730,190, issued to J. S. Brown et al., entitled "Treatment Of Oil-Containing Water," relates to the purification of contaminated water and in particular relates to the removal and recovery of oils of various types from oil-contaminated water.

U.S. Pat. No. 3,233,173, issued to S. Lees et al., entitled "Method Of Determining The Volume Of Particles In A Mixture," relates to indicating devices and more particularly comprises a method of detecting moving particles in a medium. The '173 Lees patent provides a detection system which may control an alarm or signaling device to indicate excessive amounts of contaminants in a fuel line. Another object provides a method for detecting changes in the electromagnetic properties of a material passing through a duct.

U.S. Pat. No. 3,399,135, issued to W. R. Conley, Jr., et al., entitled "Method Of Removing Solids From Liquids," provides a method for liquid carrying solids is passed at slow rate through honeycomb of tubes of restricted diameter to permit solids to deposit within tubes. Restricted diameter of the tubes causes self orificing to utilize complete storage capacity of tubes. Tubes are cleaned by draining inlet plenum, and the tubes being inclined upwardly from such plenum.

U.S. Pat. No. 3,469,702, issued to B. Perren, entitled "Apparatus For Separating Fluid Earth-Oil Products From An Earth-Oil-In-Water Mixture," is an apparatus for the separation of liquid petroleum products from a mixture of such products and water and comprising a container having a material contactable by the liquid having a higher wetting ability or affinity than water. The apparatus has separate outlets for the water freed from the petroleum products and the separated petroleum products.

U.S. Pat. No. 3,945,918, issued to B. S. Kirk, entitled "Methods And Apparatus For Treating A Liquid With A Gas," provides a method and apparatus for treating a liquid with a gas wherein a liquid feed is introduced to the initial stage of a multi-stage device for dissolving the gas in the liquid. Efficient mass transfer is achieved by effecting a gas-liquid counter flow in serial stages of the dissolution device. The effluent from the dissolution device exhibits a relatively high dissolved gas concentration which gas is subsequently consumed by the liquid in a reaction tank. A liquid recycle line is provided for returning and combining treated liquid with the incoming feed thereby enabling further dissolution of the gas in the liquid. In the course of treating wastewater with ozone, a flotation clarifier may be provided with the initial stage of the dissolution device to enable the surface coagulation of impurities in the wastewater feed. The coagulants may be skimmed prior to introducing wastewater into subsequent stages of the dissolution device, thereby substantially reducing the ultimate ozone demand of the wastewater.

U.S. Pat. No. 4,137,494, issued to F. Malley et al., entitled "Apparatus And Method For Analyzing Oil Content Of Water," discloses an oil content analyzer device containing a degradable ion transport cell designed to present a changing internal impedance as a function of the oil content of water flowing therethrough. The cell is comprised of two electrodes made of dissimilar metallic compositions with a hydrocarbon-absorbing material sandwiched therebetween, and housed in a container having openings to permit water flow therethrough. In operation, a sample of water is circulated through the degradable ion transport generating device with the result that the electrical output characteristics of the device change as a function of the amount of hydrocarbons absorbed in the membrane element, whereby an electrical signal is generated which is inversely proportional to the oil content of the analyzed water sample.

U.S. Pat. No. 4,172,789, issued to J. Huardeau, entitled "Process For Clarifying Liquids Loaded With Solid Substances In Suspension," provides a process and apparatus for clarifying a liquid loaded with suspended solid substances by decanting said substances, wherein the liquid to be treated is caused to flow along a flow path at least one portion of which is an upwardly directed flow path portion having a geometrical axis inclined with respect to the horizontal, said flow path portion being defined within an enclosure in which said liquid flows between plates arranged in at least two groups, each group containing substantially equidistant positioned plates disposed parallel to said inclined axis, said plates of each one of said groups being parallel to each other, and the parallel plates of each group forming with the vertical plane comprising said inclined axis an angle different from 90 degrees, while forming with the plates of the other group an angle of between about 20 degrees and 75 degrees, whereby the suspended substances are deposited on said plates and then slide downwardly thereon toward the wall of said enclosure.

U.S. Pat. No. 4,390,842, issued to N. D. Wygant et al., entitled "Fluid Conductivity Device For Measuring Fluid Volumes And Method Therefor," provides a device and method for measuring the volumes of oil and water in an oil and water mixture wherein the mixture flows at a constant volumetric flow rate. The device includes a formed cylindrical passageway capable of receiving the fluid mixture and for separating the fluid mixture into separate oil and water droplets while maintaining the constant volumetric flow rate. Electrical probes mounted across the passageway are interconnected with an alternating current source to apply current to the flowing oil and water droplets in the passageway. The resulting sinusoidal voltage pulses produced by the flowing oil and water droplets are compared to a predetermined voltage level and if a water droplet passes the probes, the sinusoidal voltage pulses exceed the predetermined level and these pulses are then counted. If the sinusoidal electrical pulses are less than the predetermined level due to the low conductivity of the oil droplet, then no output pulses are generated and the counter remains inactive. The pulse information provided provides a time difference between the leading and lagging interfaces of each droplet between the oil droplets and the water droplets and the measured time difference is proportional to the volume of the droplets.

SUMMARY OF THE PRESENT INVENTION

The present invention provides a simple, straightforward solution to the problem of removing fine oil particles in a waste water solution, such as brine. The method of the present invention removes these relatively small, fine waste oil particles having a particle size, for example, in a range of less than 150 microns from a waste water stream. In the initial step, seed oil particles are transmitted from an external source into the waste water stream to mix with the oil particles in the waste water stream. The seed oil particles and the waste water oil particles are allowed to mix in the waste water stream for a time interval sufficiently long so that the waste water oil particles combine with seed oil particles. Due to the increased volume of the combined seed oil and waste oil particles, they are then more easily removed from the waste water stream after the time interval.

In the preferred embodiment, the seed oil particles are larger than at least some of the waste oil particles that are removed. In the preferred method, the waste water stream is a brine solution with waste oil particles suspended therein.

In the preferred method, the waste oil particles and the combined oil are separated from the waste water stream using gravimetric separation.

In the preferred method, the oil is separated from the waste water stream using an oil/water separator.

The term "oil/water separator" as used herein is construed in a broad definition as including any vessel that facilitates the removal of oil from water. This may occur by many methods, though the preferred method is gravimetric separation. Other methods of separation using oil/water separators include flotation and hydrocyclone separation. Gravimetric oil/water separators rely on the difference of the specific gravity of the two liquids in question. Flotation oil/water separators introduce minute air or gas particles into a portion of the stream. Mixing may occur to facilitate contact. Examples include a dissolved air flotation separator, induced air flotation (mechanical type) separators, and induced air flotation (eductor-type) separators. Hydrocyclone separators subject the stream to tremendous centrifugal force through a hydrocyclone. The water, being heavier, is forced to the outside of the device while the oil is forced to the center. Coalescing devices (non-gravity) include products that provide means for adjoining particles or coalescing particles. Through a series of pipe turns and elbows, the oily water stream is gently mixed, encouraging collision of the oil particles and such devices.

In the preferred method, the seed oil particles have a particle size of greater than at least some of the waste oil particles.

In one method, the seed oil particles are introduced into the waste water stream in a counter flow fashion, for example, through a device such as a sparger located near the effluent stream of separator device. A "sparger" could include any method/device used to introduce immiscible substance into another substance, for instance, a tube, a perforated tube, sintered metals, plates, screens, filters, perforated rings, and other porous devices.

In one method, the combined waste oil and seed oil particles are separated from the waste water stream using a helical vane apparatus after mixing of the seed oil particles with the waste oil particles.

In one method, the seed particles are introduced in the waste stream flow downstream of the last shearing device (i.e. valve, pump or the like) before the oil/water separator in a co-current fashion.

Thus, it is an object of the present invention to provide an improved method of removing fine oil particles from a waste water stream using a seed oil source with particle sizes greater than at least some of the waste oil particles.

It is another object of the present invention to provide a method for facilitating the removal of oil from a waste stream or a produced water stream wherein removal of other substances is enhanced including other hydrocarbons (i.e., greases, gas), water treatment chemicals (added to facilitate separation), some drilling muds, dissolved organics (i.e., acids), and halogenated hydrocarbons.

It is another object of the present invention to provide a simple method of removing fine oil particles from a waste water stream with sand/solids present.

It is another object of the present invention to provide a method of removing fine waste oil particles from a waste water stream using larger particles of seed oil so that the seed oil and waste oil particles combine forming even larger particles that can be easily removed by gravimetric separation.

It should be understood that the term "oil/water separator" as used herein should be construed in its broadest definition as covering any vessel that facilitates the removal of oil from water. This may occur by many methods though the preferred method is gravimetric separation. Other methods of separation would include flotation, and hydrocyclone separation. Gravimetric oil/water separators rely on the difference in the specific gravity of the two liquids in question. Explained theoretically by Stokes Law, a sphere of given liquid A, and entrained within a matrix consisting of liquid B, will rise towards the surface of liquid B at a velocity that is a function of the difference in specific gravities, the diameter of the sphere, various physical characteristics of the two liquids, and temperature. Types of gravimetric separators include corrugated plate interceptors (CPI), parallel plate interceptors (PPI), caissons, tanks, two and three phase separators, helix/nautilus separators, sump pits, shotgun barrel tanks, holding vessels, knock-out pots, and free-water knock-outs.

It is another object of the present invention to provide a method of removing fine oil particles in a brine solution for instance, those having a particle size of less than 150 microns.

BRIEF DESCRIPTION OF THE DRAWINGS

For a further understanding of the nature, objects, and advantages of the present invention, reference should be had to the following detailed description, taken in conjunction with the accompanying drawings, in which like reference numerals denote like elements, and wherein.

DETAILED DESCRIPTION OF THE PREFERRED EMBODIMENT

Figure 2:
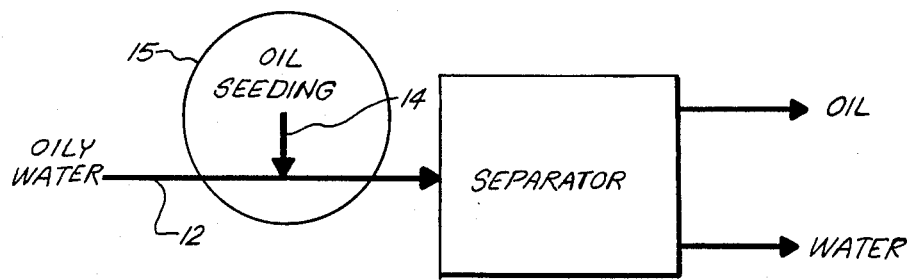
FIG. 2 is a schematic diagram illustrating the preferred method of the present invention.
Figure 3:
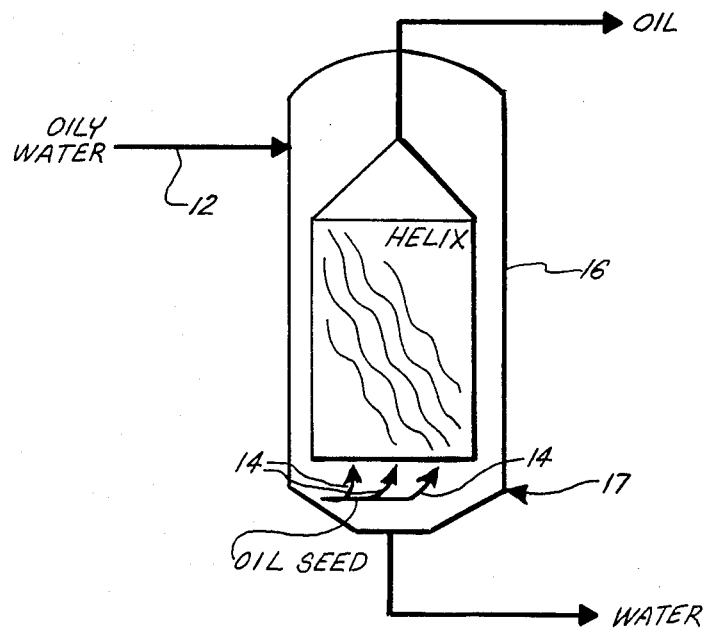
FIG. 3 is a schematic diagram illustrating use of an oil helix for removing oil using the method of the present invention.

FIGS. 2 and 3 show generally the preferred method of the present invention. In FIG. 2, there can be seen a line 12 which represents schematically a pipeline, for example, carrying a stream for waste water, such as, for example, a brine solution. Such a stream of waste water can, for example, include relatively small waste oil particles having a particle size for instance in the range of less than 150 microns. Waste water stream, for example, can be any typical carrier of waste water, such as a pipeline, for example.

As part of the method of the present invention, seed oil is transmitted through an external source, such as laterally extending pipeline 14 which is designated schematically as the oil seeding station 15. Line 14 simply feeds seeding oil from an external source, such as another pipeline or effluent of separator, into the line 12 which carries oily water and brine solution or other such waste water stream. As an example, the line 12 could be, for example, a two inch (2") internal diameter feed line while the oil seeding line 14 could be, for example, a one quarter inch ($\frac{1}{4}$") tube which transmits seed oil into the waste water line 12.

In FIG. 3, an alternate embodiment illustrates the flow of waste water via line 12 into an oil helix structure, such as is described in copending patent application, Ser. No. 06/902,592, filed on September 2, 1986, now U.S. Pat. No. 4,626,360 which is incorporated herein by reference. The helix 16 can receive oil seed through its lower end portion 17 so that oily water or other like waste water entering the helix 16 via line 12 flows downwardly and mixes with the oil seed injected through one or more oil seed lines 14.

Figure 1:
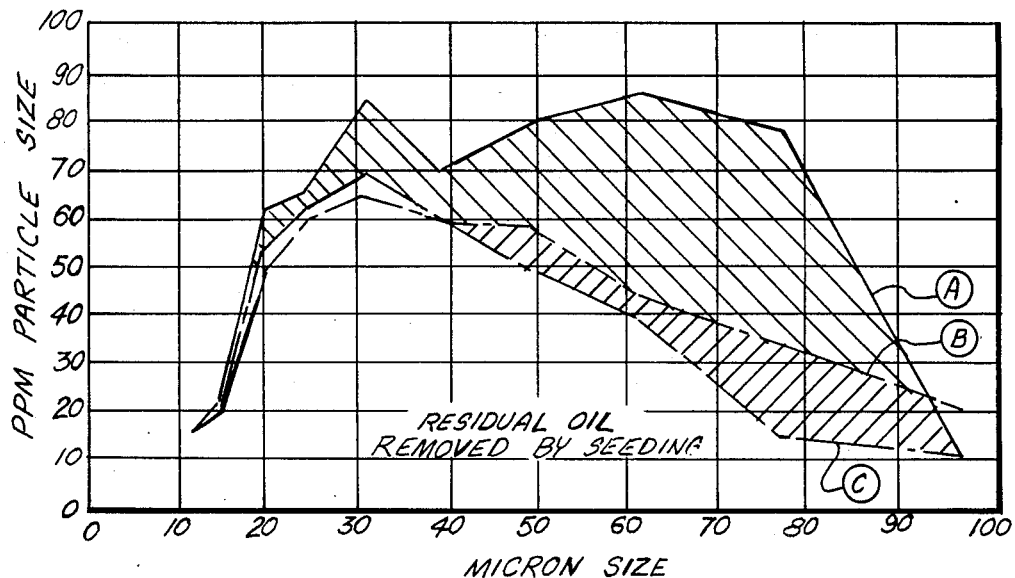
FIG. 1 is a schematic view of a graph illustrating an exemplary removal of oil using the method of the present invention.

The introduction of oil, as large particles via the seed line 14, causes removal of a large population of oil particles. As shown in the graph of FIG. 1, the larger oil particles appear to collect the smaller particles that would be difficult to remove with gravimetric separation. As can be seen in FIG. 1, the removal of oil particles ranges generally from 1 microns to 97 microns. The introduction of a seeding oil with particle size greater than at least some of the waste oil particles will effectively enhance the removal of an existing population of smaller oil particles that would be difficult to remove with a separation device. In FIG. 1, A designates particle size distribution in oily water stream after seeding; B designates particle size distribution in oily water stream before seeding; and C designates particle size distribution in effluent stream of separator.

As aforedescribed, the seeding can be co-current by a separation device treatment (FIG. 2) or injected within the separation device (FIG. 3) counter current to the stream.

In view of the numerous modifications which could be made to the preferred embodiments disclosed herein without departing from the scope or spirit of the present invention, the details herein are to be interpreted as illustrative and not in a limiting sense.

What is claimed as invention is:

1. A method of removing relatively small waste oil particles having a particle size in the range of less than one hundred microns from a waste water stream comprising the steps of:
   (a) transmitting seed oil particles from an external source into the waste water stream;
   (b) allowing the seed oil particles and waste water oil particles to mix in the wastewater stream for a time interval sufficiently long so that waste oil particles combine with the seed oil particles; and
   (c) removing oil that includes the seed oil and the combined waste oil particles from the waste water stream after the time interval.

2. The method of claim 1, wherein the seed oil particles are larger than at least some of the waste oil particles that are removed.

3. The method of claim 1, wherein the waste water stream is a solution with waste oil particles suspended therein.

4. The method of claim 1, wherein in step "c", the waste oil particles and the combined oil are separated from the waste water stream using gravimetric separation.

5. The method of claim 4, wherein the oil is separated from the waste water stream using an oil/water separator.

6. The method of claim 1, wherein the seed oil particles have a particle size greater than twenty (20) microns.

7. The method of claim 1, wherein the seed oil particles in step "a" are introduced into the waste water stream through a sparger.

8. The method of claim 7, further comprising the step of separating the combined waste oil and seed oil particles from the waste water stream using a helical vane after a mixing of the seed oil particles and the waste oil particles.

9. The method of claim 4, 5, or 8, wherein the seed oil in step "b" is added upstream of the separation of step "c".

10. The method of claim 4, 5, or 8, wherein the seed oil particles are mixed in an oil separator internally of the separator and upstream of the effluent of the separator.

11. The method of claim 4, 5, or 8, wherein the oil seeding is co-current with the waste water stream.

12. The method of claim 4, 5, or 8, wherein the oil seeding is counter current to the waste water stream.

* * * * *